United States Patent [19]

Noah

[11] Patent Number: 5,058,712

[45] Date of Patent: Oct. 22, 1991

[54] PRE-LOADING PIVOTAL PIN CONNECTION FOR A DISC BRAKE ASSEMBLY

[75] Inventor: Lewis R. Noah, Greer, S.C.

[73] Assignee: American Standard Inc., Spartanburg, S.C.

[21] Appl. No.: 377,022

[22] Filed: Jul. 7, 1989

[51] Int. Cl.[5] .................... B61H 13/38; F16D 65/95
[52] U.S. Cl. .................... 188/59; 188/72.9; 188/206 R; 411/83; 411/427
[58] Field of Search .............. 188/59, 72.9, 73.41, 188/71.1, 206 R; 192/115; 411/110, 427, 83

[56] References Cited

U.S. PATENT DOCUMENTS

| | | | |
|---|---|---|---|
| 1,388,250 | 8/1921 | Godfrey | 411/83 X |
| 2,436,136 | 2/1948 | Baselt | 188/59 |
| 2,713,400 | 7/1955 | Coskun | 188/72.9 X |
| 3,494,448 | 2/1970 | Ruprecht et al. | 188/731 |
| 3,692,148 | 9/1972 | Hauth | 188/71.1 X |
| 3,887,045 | 6/1975 | DeHoff et al. | 188/73.45 |
| 4,225,025 | 9/1980 | Crawford | 188/71.1 X |
| 4,448,565 | 5/1984 | Peterson | 41/427 X |
| 4,828,441 | 5/1989 | Frasca | 411/427 X |

FOREIGN PATENT DOCUMENTS

| | | | |
|---|---|---|---|
| 2656052 | 6/1978 | Fed. Rep. of Germany | 188/59 |
| 393838 | 11/1965 | Switzerland | 411/83 |
| 786090 | 11/1957 | United Kingdom | 188/59 |

Primary Examiner—George E. Halvosa
Attorney, Agent, or Firm—J. B. Sotak

[57] ABSTRACT

A preloading pivotal pin connection arrangement for interconnecting a swivel bracket to a forked support bracket of a fluid pressure operated caliper disc brake unit. The pivotal pin includes a shoulder portion which fits snugly into a hole formed in one leg of the forked support bracket, and includes a hexagonal nut having a sleeve portion which fits snugly into a hole formed in the other leg of the forked support bracket. The intermediate portion of the pivot pin rotates freely in a bushing carried by the swivel bracket, and a locking plate prevents the backing off of the nut due to vibrations.

18 Claims, 2 Drawing Sheets

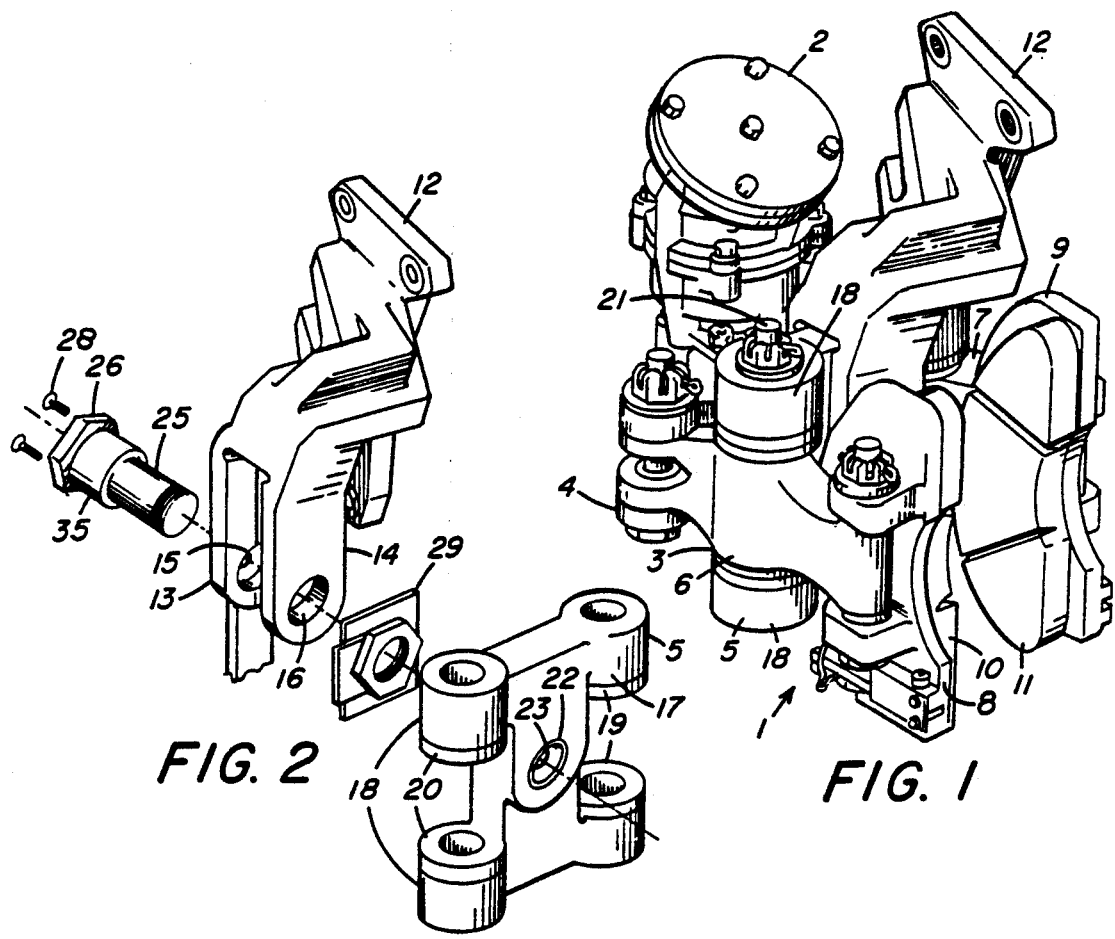
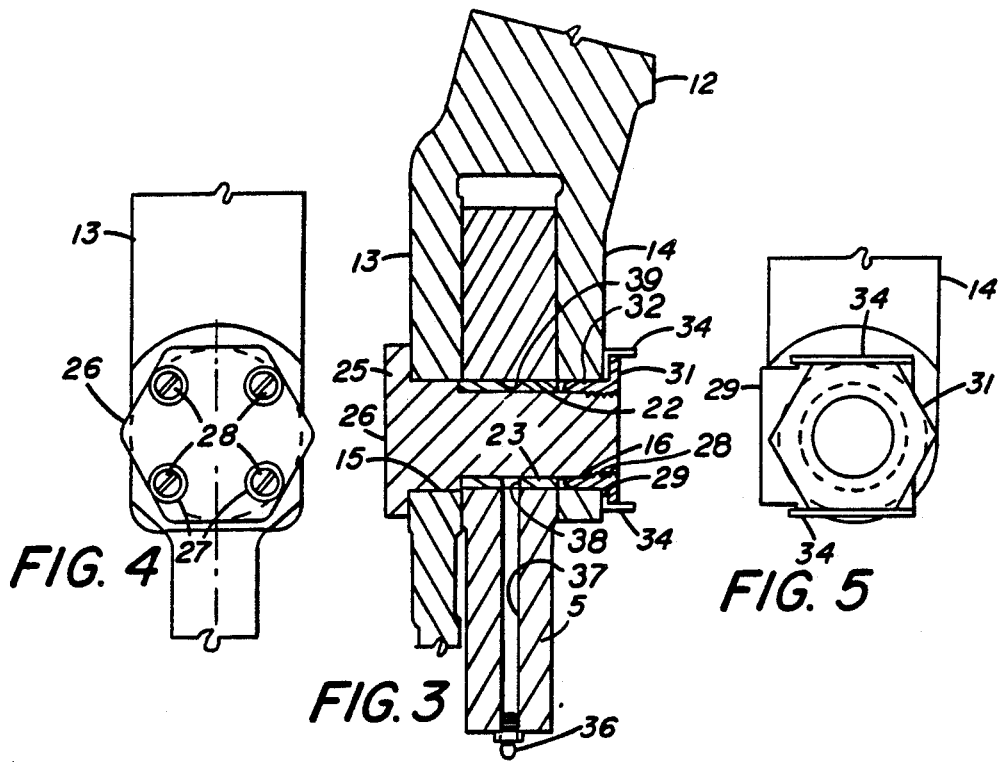

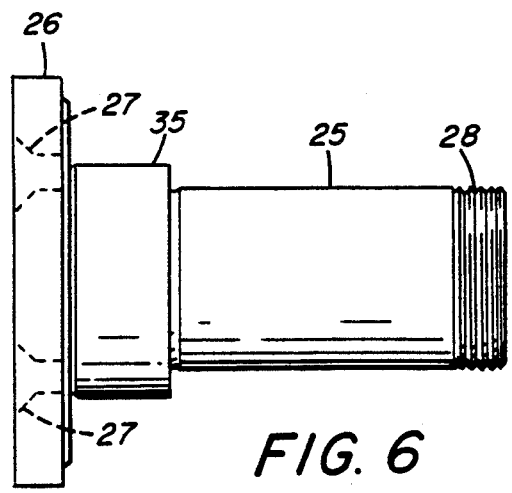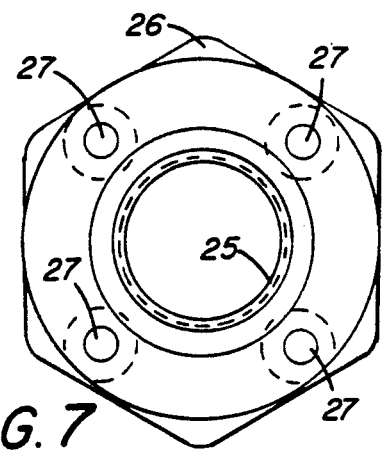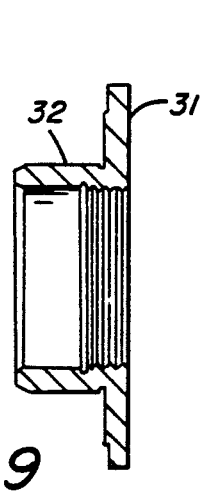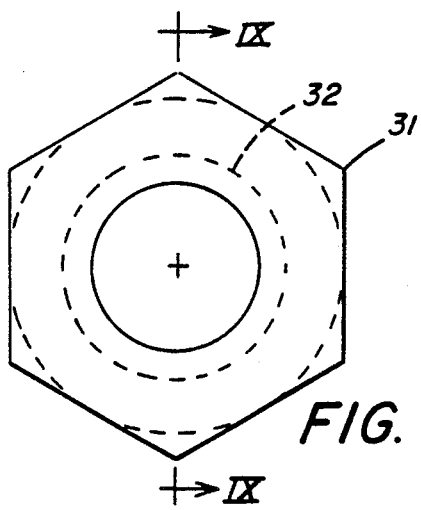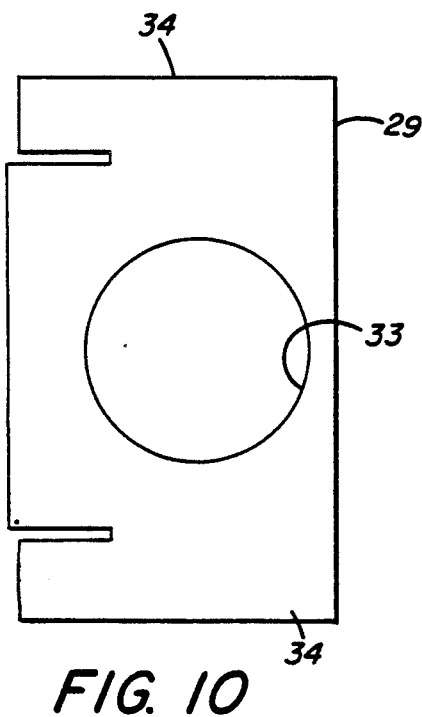

PRE-LOADING PIVOTAL PIN CONNECTION FOR A DISC BRAKE ASSEMBLY

FIELD OF THE INVENTION

This invention relates to a pivotal connection for joining a support bracket to a swivel bracket of a vehicle disc brake unit and, more particularly, to a pre-loading swivel pin arrangement including a shouldered bolt, a locking plate, and a sleeve nut for pivotally connecting a swivel bracket to the legs of a support bracket of a hydropneumatic pressure operated caliper brake assembly for railway vehicles.

BACKGROUND OF THE INVENTION

In mass and/or rapid transit operation, the railway vehicles, primarily passenger cars, are generally equipped with disc brake units. Each of the disc brake units includes a hydropneumatic pressure operated actuator portion and a caliper assembly. The actuator portion of each disc brake unit functions to accept brake cylinder air and to amplify the pressure eleven (11) to twelve (12) times to a hydraulic pressure. The hydraulic pressure then acts on a piston to provide the force to tongs of the caliper assembly. That is, the caliper assembly and the actuator portion work together during a brake application to move the tongs of the caliper and position the brake heads with the attached brake shoes so that a gripping force is applied to the braking surface of an axle mounted disc. Generally, an automatic slack adjuster is built into the actuator to maintain the proper clearance between the brake shoes and the disc brake unit as the brake shoes wear. The caliper assembly normally consists of a swivel bracket, two tongs with attached brake heads, and a bifurcated support bracket. The tongs are pivotally mounted to the swivel bracket, and the swivel bracket is pivotally connected to the bifurcated support bracket. The bifurcated support bracket is used to mount the disc brake unit to the railway vehicle and, in some cases, to provide an attachment for the parking brake portion. In practice, the tongs transmit the output force of the actuator through the fulcrum to the brake heads to clamp the brake shoes or pads onto the disc brake unit. The swivel bracket is attached to two depending legs of the bifurcated support bracket by a swivel pin which provides a relative movement to the disc brake unit. This flexibility is necessary because the bifurcated support bracket, in some cases, is attached to the sprung portion of the vehicle to which the disc brake unit is directly attached to the wheels or axle of the vehicle.

Recently, a railway transit operator reported a breakage failure of the caliper braking unit in which the long leg of the bifurcated support bracket broke at a point where it joined the bracket. Upon examination of the braking unit, the shorter leg of the bifurcated support bracket remained in tact, but appeared to be slightly bent outwardly as a result of the failure. Upon closer examination, it was found that the swivel pin was firmly seized in the longer broken leg, and that the end of the swivel pin associated with the shorter leg was severely pitted and corroded. The corroded end was out of tolerance and was undersized by several hundredths of an inch, and the associated bushing was heavily corroded and oversized by several hundredth inches. Upon further examination, it was observed that the center or intermediate portion of the swivel pin was relatively clean, and its diameter was within the manufacturing tolerances, as was the inside diameter of the bushing located in the swivel bracket. The frozen end of the swivel pin, lodged in the bushing of the longer leg, was difficult to move, and required a considerable amount of force to separate. However, the outer diameter of the center portion of the swivel pin and the inner diameter of the associated bushing were within the manufacturing tolerances. It was concluded from the way that the swivel pin and bushings wore, that the broken leg was the result of overloading which occurred during braking operations. It will be appreciated that when the wheel turns in a counterclockwise direction, as viewed from the outside of the railway vehicle, a clockwise moment is exerted on the swivel bracket via the brake head and the brake tong. This tends to twist the swivel bracket, which is disposed between the two legs of the bifurcated support bracket. Thus, the swivel bracket bears against the inside edge near the end of the longer leg, and also against the inside edge near the top of the shorter leg. In normal operation, the longer leg slightly bends outwardly and reaches a point where the load is transmitted by the swivel pin to the shorter leg so that both legs share the load equally. However, if the end of the swivel pin and/or the associated bushing in the shorter leg are severely worn or corroded, the longer leg is permitted to bend much further before the swivel pin transmits any load to the shorter leg. At some point, the bending force exceeds the tensile stress of the ductile iron support bracket so that the longer leg fails by being broken.

OBJECTS AND SUMMARY OF THE INVENTION

Accordingly, it is an object of this invention to provide a new and improved swivel pin connection between a bifurcated support bracket and a swivel bracket of a disc brake unit for railway vehicles.

A further object of this invention is to provide a unique swivel pin arrangement for interconnecting a swivel bracket to a bifurcated support bracket of a disc brake assembly.

Another object of this invention is to provide a novel disc brake unit having a swivel bracket pivotally connected to a two-legged support bracket by a pivot pin which is fixed at its ends of the two legs of the support bracket.

Yet a further object of this invention is to provide a new disc brake assembly having a swivel bracket pivotally connected to a bifurcated support bracket by a pivot pin which preloads the bifurcated support bracket in compression.

Yet another object of this invention is to provide an improved caliper disc brake unit having a hydropneumatic pressure operated actuator for opening and closing a pair of brake shoe heads carried by tongs pivotally connected to an H-shaped swivel bracket, which is pivotally connected to a forked support bracket by a pivot bolt and nut which are torqued to preload the forked support bracket in compression.

Still a further object of this invention is a new pivot pin arrangement for interconnecting a swivel bracket to a support bracket for a disc brake unit which is economical in cost, effective in operation, reliable in use, durable in service, simple in construction, and easy to install.

Still another object of this invention is to provide a caliper disc brake unit comprising, a swivel bracket carrying a pair of pivotal tongs carrying brake shoe heads which are opened and closed by a fluid actuator, the swivel bracket is pivotally connected between two legs of a forked support bracket by a pivot bolt and a nut which preloads the two legs of the forked support bracket in compression, and which causes the two legs to share the load forces transmitted to the swivel bracket by the tongs during braking.

In accordance with the present invention, there is provided a pivotal connection for joining an H-shaped swivel bracket to a two-legged support bracket of a caliper disc brake assembly for railway vehicles comprising, said H-shaped swivel bracket positioned between the two legs of the support bracket and having a through hole which is aligned with through holes formed in the two legs of the support bracket, a pivot bolt passing through the through holes and having a head engaging the outer surface of one of the two legs of the support bracket, a fastening nut screw-threaded onto the free end of the pivot bolt adjacent the outer surface of the other of the two legs of the support bracket, a locking member cooperatively associated with the fastening nut, the pivot bolt having an enlarged shoulder portion tightly engaging the through hole in the one leg of the support bracket, the fastening nut having a sleeve portion tightly engaging the through hole in the other leg of the support bracket, and the through hole in the swivel bracket having a bushing which loosely fits the intermediate portion of the pivot bolt to allow pivotal movement between the swivel bracket and the support bracket.

DESCRIPTION OF THE DRAWINGS

The above objects and other attendant features and advantages will be more readily appreciated as the present invention becomes better understood by reference to the following detailed description when considered in conjunction with the accompanying drawings:

FIG. 1 is a perspective view of an assembled hydropneumatic actuated caliper disc brake unit for railway passenger vehicles;

FIG. 2 is a partial exploded perspective view of the support bracket, swivel bracket, pivot bolt, fastening nut, and plate of the disc brake unit of FIG. 1;

FIG. 3 is a partial enlarged sectional view of the pivotal connection of the support and swivel brackets;

FIG. 4 is an elevational end view of the broken-away long leg of FIG. 3;

FIG. 5 is an elevational end view of the broken-away short leg of FIG. 3;

FIG. 6 is an enlarged plan view of the pivot bolt or swivel pin used in the disc brake unit of FIG. 1;

FIG. 7 is an elevational end view of the swivel bolt as viewed from the threaded end of FIG. 6;

FIG. 8 is an elevational end view of the fastening nut used in the disc brake unit of FIG. 1;

FIG. 9 is a cross-sectional view taken along lines IX—IX of FIG. 8; and

FIG. 10 is a front plan view of the locking plate used in the disc brake unit of FIG. 1.

DETAILED DESCRIPTION OF THE INVENTION

Referring now to the drawings, and in particular to FIG. 1, there is shown a typical assembled right-hand disc brake unit, generally characterized by numeral 1, for utilization in railway passenger vehicles and lightweight rail cars. The disc brake unit or assembly 1 includes an actuator portion 2 and a caliper assembly 3.

The actuator portion 2 is a hydropneumatic pressure operated device which receives air pressure, and which converts this air pressure into a highly amplified hydraulic pressure. The hydraulic pressure then acts on a suitable piston to provide the required braking force through pivot points (one shown at 4) to the caliper assembly 3. The caliper assembly 3 includes a swivel bracket 5, two rotatable tongs 6 and 7 with attached brake heads 8 and 9 and shoes 10 and 11, and a bifurcated support bracket 12. The swivel bracket 5 and the tongs 6 and 7 are mounted on the bifurcated support bracket 12.

As shown in FIGS. 2 through 5, the bifurcated support bracket 12 is a cast ductile iron member having a pair of spaced depending forks or legs 13 and 14. In practice, the bifurcated support bracket 12 is appropriately secured by bolts, or the like, to the body or frame of the railway passenger vehicle. The depending leg 13 is longer than the leg 14 and includes an intermediate circular through hole 15, while the shorter leg 14 also includes a circular through hole 16 which is in axial alignment with through hole 15.

As shown in FIGS. 1 and 2, the H-shaped swivel bracket 5 includes a pair of vertically aligned trunnions 17 and 18, each having flanged bushings 19 and 20 for accommodating fulcrum pins 21 which pivotally interconnect the tongs 6 and 7 to the swivel bracket 5. In viewing FIGS. 2 and 3, it will be noted that the swivel bracket 5 includes a centrally located circular through hole 22 which accommodates a cylindrical bushing 23. In practice, a press fit exists between the outer surface of bushing 23 and the circular hole 22 of the swivel bracket 5. During assembly, the swivel bracket 5 is positioned between the two legs 13 and 14 of the bifurcated support bracket 12, and the center bushing 23 and through hole 22 of the swivel bracket 5 are aligned with the through holes 15 and 16 of the respective legs 13 and 14. A shouldered pivot bolt or swivel pin 25 is inserted through hole 15, bushing 23, and hole 16. The pivot pin 25 includes a hexagonal head 26 having four (4) equally spaced screw holes 27 for receiving flat head screws 28, as shown in FIG. 4. However, it will be appreciated that the head of the bolt or pin 25 may take other forms such as a square head or a round head having 2 or 4 peripheral slots which could be tightened or loosened with a crescent or spanner wrench, respectively. The screws 28 are received in threaded holes formed in the outer face of the longer leg 13 to securely hold the pivot bolt 25 in place. Next, a locking plate 29 is placed on the threaded end 30 of the pivot bolt 25, and then a threaded hexagonal nut 31 having a sleeve portion 32 is passed through a central circular opening 33 formed in the locking plate 29, and is screwed onto the threads 30 of the pivot pin 25. Then, the nut 31 is tightened to a predetermined torque value so that the legs 13 and 14 of the bifurcated support bracket 12 are placed in compression. Next, slotted tabs 34 of the locking plate 29 are bent outwardly away from the outer surface of leg 14 to approximately ninety degrees (90°) so that the inner surfaces of the slotted tabs 34 contact the sides or periphery of the hexagonal nut 31, as shown in FIGS. 3 and 5. Thus, the nut hexagonal nut 31 is positively locked in place so that shock and vibrations will not loosen or unscrew it which ensures that the pre-loading condition will not be accidentally or inadvertently removed. It has been found that the pre-loading allows the legs 13 and 14 to withstand greater torsion loads and shear forces than was the case in the past in which the legs of the bifurcated support bracket 12 were not preloaded.

In viewing FIGS. 2, 3 and 6, it will be noted that the pivot bolt 25 includes an enlarged shoulder portion 35 formed adjacent the head portion 26. The cylindrical shoulder 35 has a diameter which is substantially the same as the diameter of the circular hole 15 formed in leg 13. Likewise, the outer diameter of the sleeve 32 is substantially the same as the diameter of the circular hole 16 formed in leg 14. Thus, the shoulder 35 and sleeve 32 fit snugly into the respective holes 15 and 16. This close and tight fit ensures that the initial load exerted on the longer leg 13 is quickly transmitted through the pin or bolt 25 to the shorter leg 14. That is, the forces occurring during braking are immediately transferred through the pivot bolt 25 and are equally shared by both of the legs 13 and 14 of the bifurcated support bracket 12. It will be appreciated that the relative rotational motion between the swivel bracket 5 and the bifurcated support bracket 12 occurs between the center of the pivot pin 25 and the bushing 23. Accordingly, it is only necessary to lubricate the intermediate periphery of the bolt 25 and the inner surface of the bushing 23. This is accomplished by providing a grease fitting 36 to the bottom end of a centrally located passageway 37 formed in the lower portion of the swivel bracket 5. The passageway 37 communicates with holes 38 and an annular groove 39 formed around the outer periphery of the bushing 23. Thus, the swivel pin and bushing may be quickly and easily greased or lubricated with an appropriate grease gun by a maintainer or other railroad personnel during periodic inspection of the braking apparatus. Hence, this pre-loaded pivotal connection arrangement is superior, and minimizes the chance of failure due to fracture or breakage.

It will be appreciated that only the movable center portion of the pivot pin 25 is exposed to frictional wear because the ends are relatively fixed in the legs 13 and 14. Thus, only the center portion of the pin 25 requires periodic lubrication to minimize wear. By sufficiently tightening the nut, the pin will apply a compressive pre-load to the inside of the two legs of the bifurcated support bracket 12. This area of the support bracket 12 is heavily loaded in tension and this will increase its capacity to withstand greater torsional forces. The unique pin arrangement enables both legs to equally share the braking load. Since no bushings are utilized on the respective ends of the pivot pin, the extra stress caused by press fit is not placed on the legs of the bifurcated support bracket 12. In order for the pivot pin 25 to come loose, the clamp load and shear strength of the four screws holding it in place would have to be overcome. There is no threaded part with a twisting action around it to cause loosening of the pivot pin 25.

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be appreciated that the fluid actuator may take the form of an air or pneumatic device or may be a hydraulic piston cylinder or similar device. It will be understood that other variations, modifications, equivalents, and substitutions for components of the above specifically described embodiment of the invention may be made by those skilled in the art without departing from the spirit and scope of the invention as set forth in the appended claims.

I claim:

1. A pivotal connection for joining an H-shaped swivel bracket to a two-legged support bracket of a caliper disc brake assembly for railway vehicles comprising, said H-shaped swivel bracket positioned between the two legs of the support bracket and having a through hole which is aligned with through holes formed in the two legs of the support bracket, a pivot bolt passing through the through holes and having a head engaging the outer surface of one of the two legs of the support bracket, a fastening nut screw-threaded onto the free end of the pivot bolt and being sufficiently torqued to preload the two legs of the support bracket, a locking member cooperatively associated with the fastening nut, the pivot bolt having an enlarged shoulder portion tightly engaging the through hole in the one leg of the support bracket, the fastening nut having a sleeve portion tightly engaging the through hole in the other leg of the support bracket, and the through hole in the swivel bracket having a press fit metal bushing which loosely fits the intermediate portion of the pivot bolt to allow pivotal movement between the swivel bracket and the support bracket.

2. The pivotal connection, as defined in claim 1, wherein the fastening nut is turned onto the pivot bolt until the two legs of the support bracket are placed in compression.

3. The pivotal connection, as defined in claim 1, wherein said locking member is a flat plate having tabs which are bent to engage the periphery of the fastening nut.

4. The pivotal connection, as defined in claim 1, wherein the head of the pivot bolt includes a plurality of holes for accommodating screws which are threaded into the one of the two legs of the support bracket.

5. The pivotal connection, as defined in claim 1, wherein the swivel bracket includes a lubricating fitting and passageway leading to the bushing.

6. The pivotal connection, as defined in claim 5, wherein said bushing includes at least one hole and one annular groove communicating with said passageway.

7. The pivotal connection, as defined in claim 5, wherein the lubricating fitting is threaded onto the bottom end of said passageway.

8. The pivotal connection, as defined in claim 1, wherein the bolt and the nut each have a head portion.

9. The pivotal connection, as defined in claim 1, wherein said pivot bolt enables the two legs of the support bracket to equally share the braking load.

10. The pivotal connection, as defined in claim 1, wherein forces occurring during braking are transferred through the pivot bolt and are equally shared by the two legs of the support bracket.

11. The pivotal connection, as defined in claim 1, wherein a pair of brake shoe heads are carried by tongs which are pivotally connected to said H-shaped swivel bracket.

12. The pivotal connection, as defined in claim 1, wherein said locking member is interposed between the other of the two legs of the support bracket and the fastening nut.

13. In a caliper disc brake unit comprising, a swivel bracket means carrying a pair of pivotal tong means having brake shoe heads which are opened and closed by a fluid actuator means, said swivel bracket means is pivotally-connected between two leg means of a forked support bracket means by a pivot bolt means and a nut means which preloads the two leg means of said forked support bracket means in compression, and which causes the two leg means to effectively share the load forces transmitted to the swivel bracket means by the tong means during braking, said pivot bolt means includes an apertured head portion which is secured to one of the two leg means of said forked support bracket means by a plurality of screws and includes an enlarged shoulder portion which fits snugly into a hole formed in one leg means of said forked support bracket means.

14. In the caliper disc brake unit, as defined in claim 2, wherein said swivel bracket means includes a hole for accommodating a bearing bushing which fits loosely on the intermediate portion of said pivot bolt means.

15. In the caliper disc brake unit, as defined in claim 14, wherein said swivel bracket means includes a lubricating fitting and passageway leading to said bearing bushing.

16. In a caliper disc brake unit comprising, a swivel bracket means carrying a pair of pivotal tong means having brake shoe heads which are opened and closed by a fluid actuator means, said swivel bracket means is pivotally-connected between two leg means of a forked support bracket means by a pivot bolt means and a nut means which preloads the two leg means of said forked support bracket means in compression, and which causes the two leg means to effectively share the load forces transmitted to the swivel bracket means by the tong means during braking, said pivot bolt means includes an apertured head portion which is secured to one of the two leg means of said forked support bracket means by a plurality of screws, and said nut means includes an integral sleeve portion which fits snugly into a hole formed in the other leg means of said forked support bracket means.

17. In the caliper disc brake unit, as defined in claim 2, wherein a locking plate is interposed between the said other leg means of said forked support bracket means and said nut means.

18. In the caliper disc brake unit, as defined in claim 17, wherein said locking plate includes tab portions which are bent over the peripheral edge of said nut means.

* * * * *